June 24, 1930. W. O. BLACKMUN 1,766,277
LAWN MOWER REEL TRUING AND SHARPENING MACHINE
Filed May 26, 1928 6 Sheets-Sheet 1
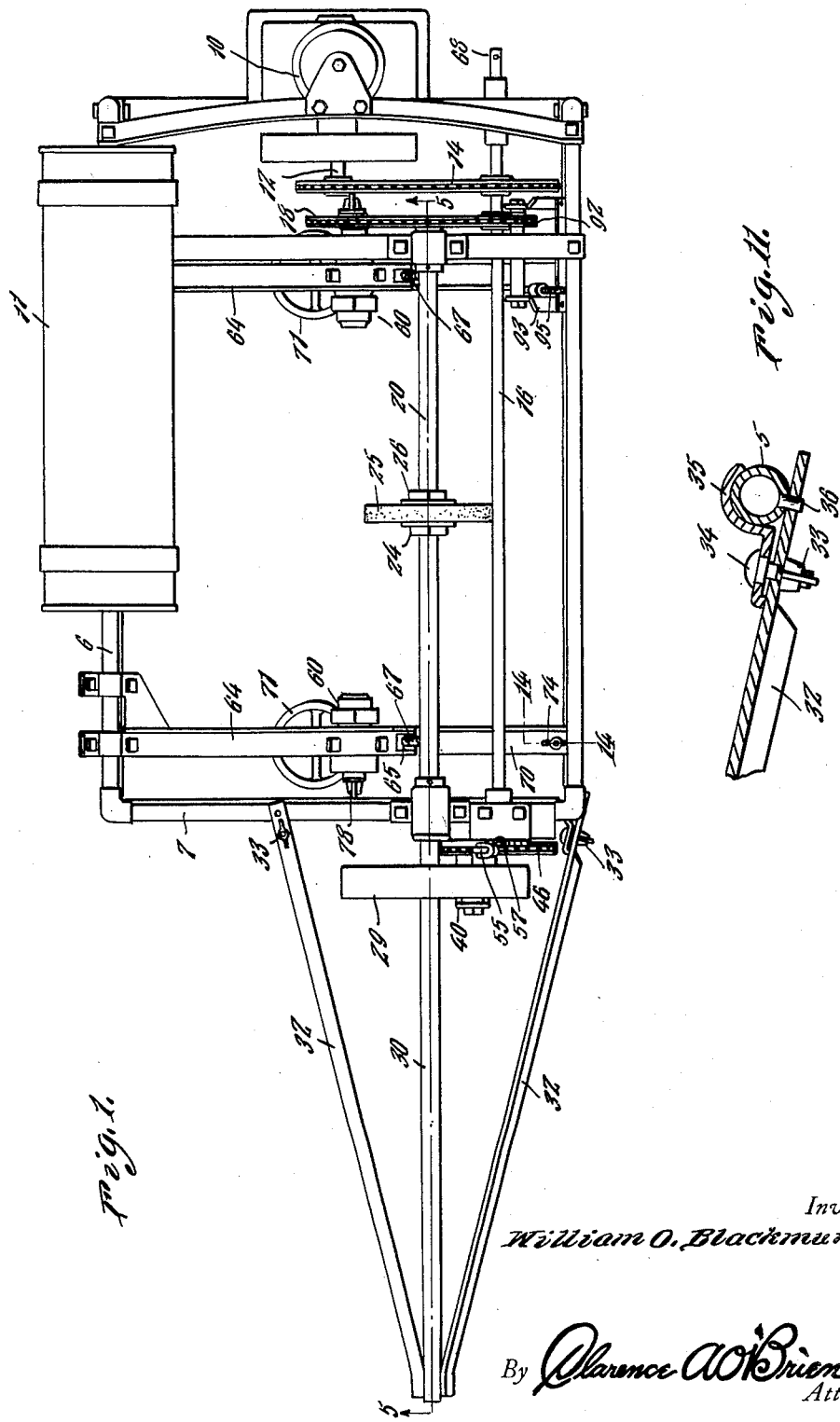
Inventor
William O. Blackmun
By Clarence A. O'Brien
Attorney

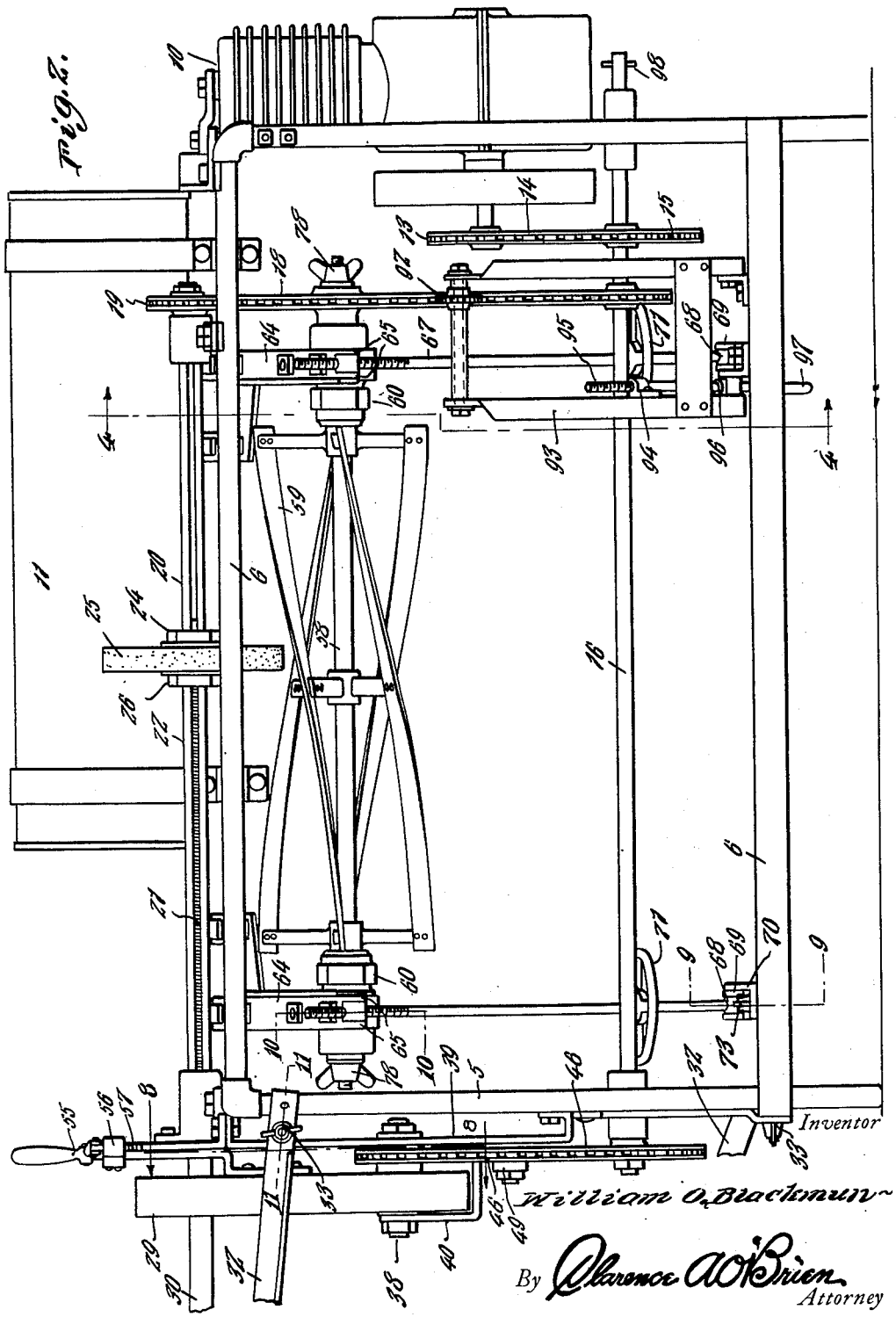

June 24, 1930.  W. O. BLACKMUN  1,766,277
LAWN MOWER REEL TRUING AND SHARPENING MACHINE
Filed May 26, 1928   6 Sheets-Sheet 3
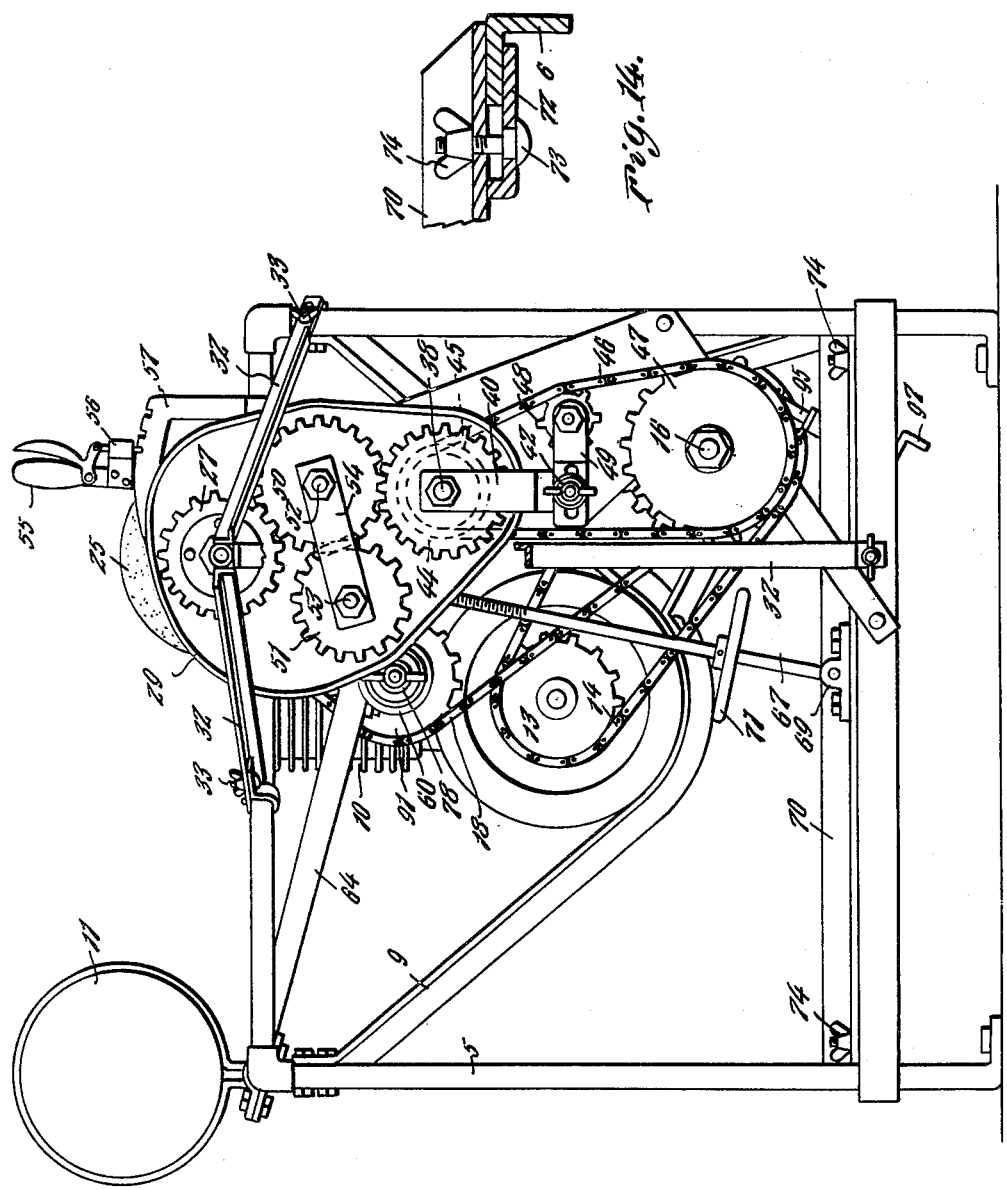

June 24, 1930. W. O. BLACKMUN 1,766,277
LAWN MOWER REEL TRUING AND SHARPENING MACHINE
Filed May 26, 1928 6 Sheets-Sheet 4
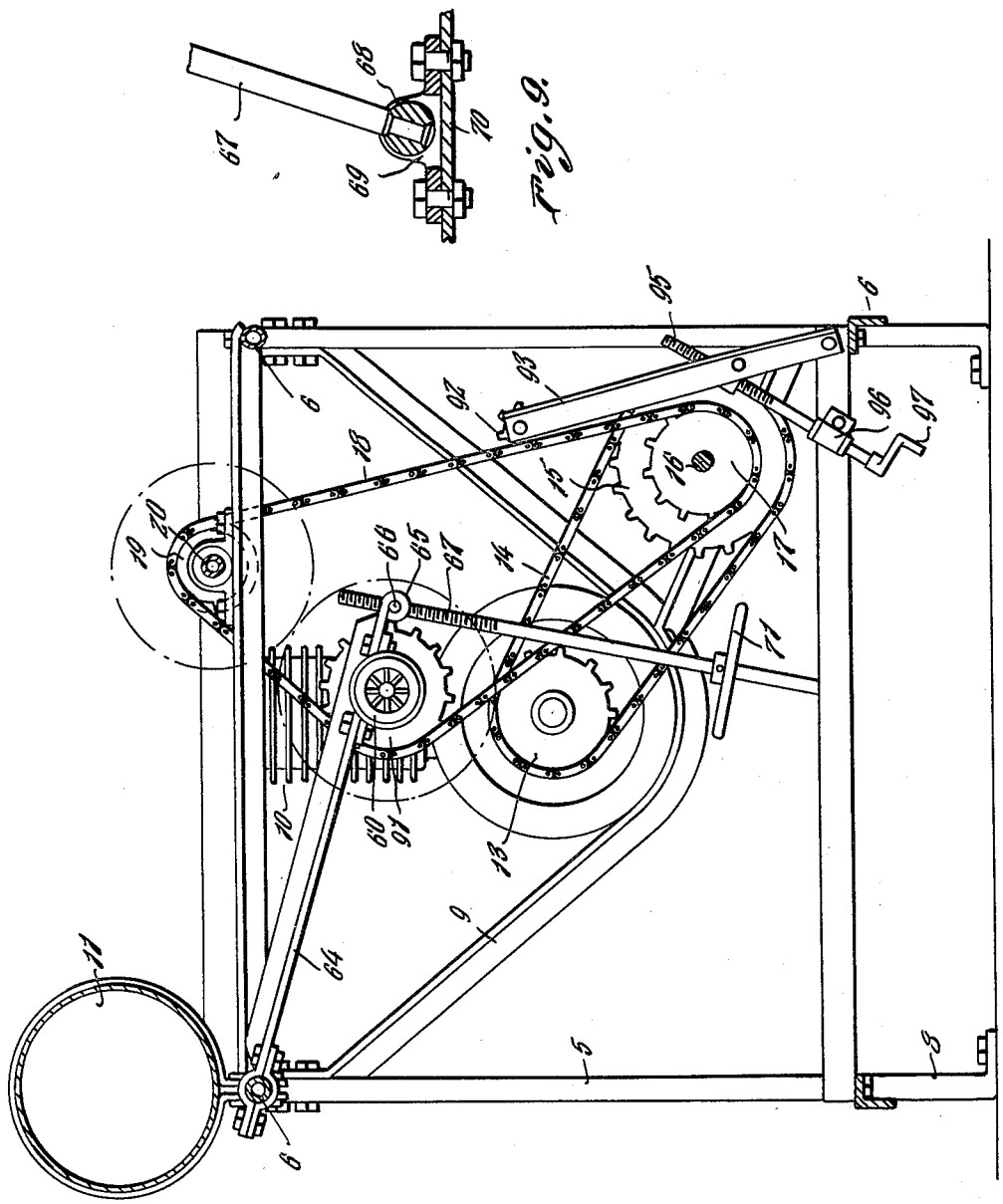
Inventor
*William O. Blackmun*
By *Clarence A. O'Brien*
Attorney

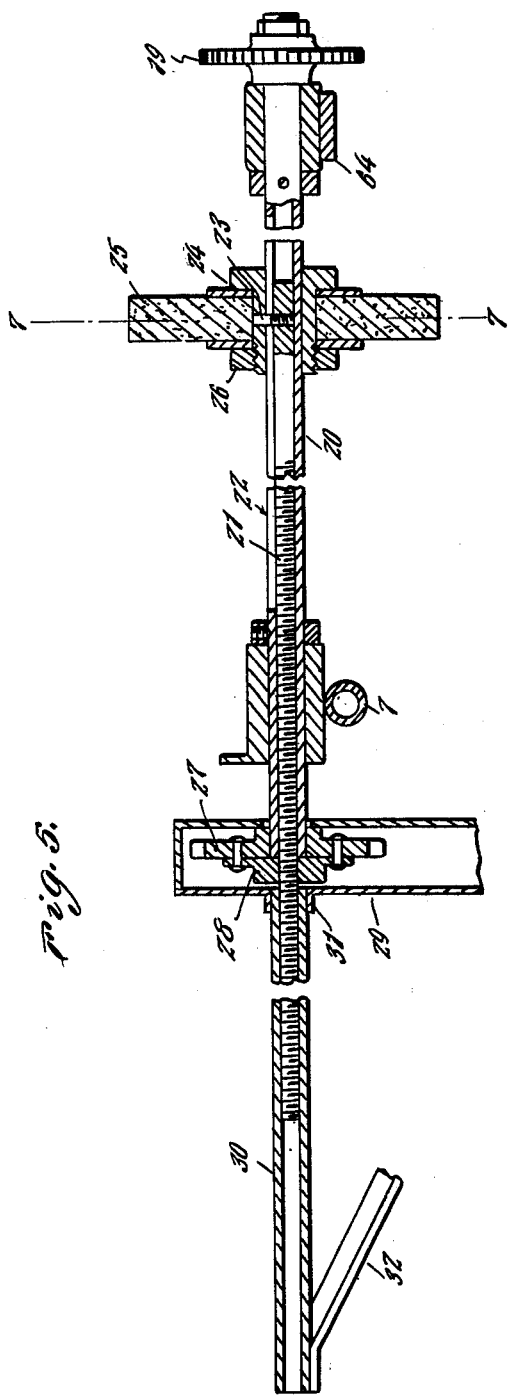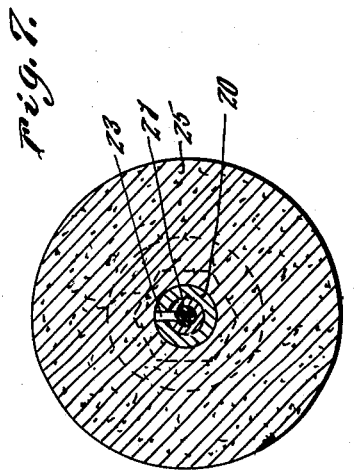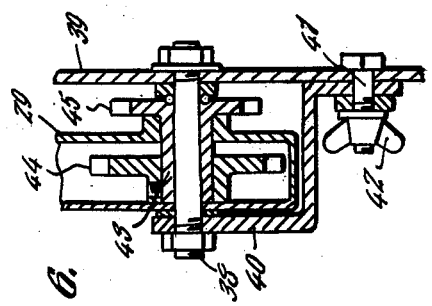

June 24, 1930. W. O. BLACKMUN 1,766,277
LAWN MOWER REEL TRUING AND SHARPENING MACHINE
Filed May 26, 1928 6 Sheets-Sheet 6
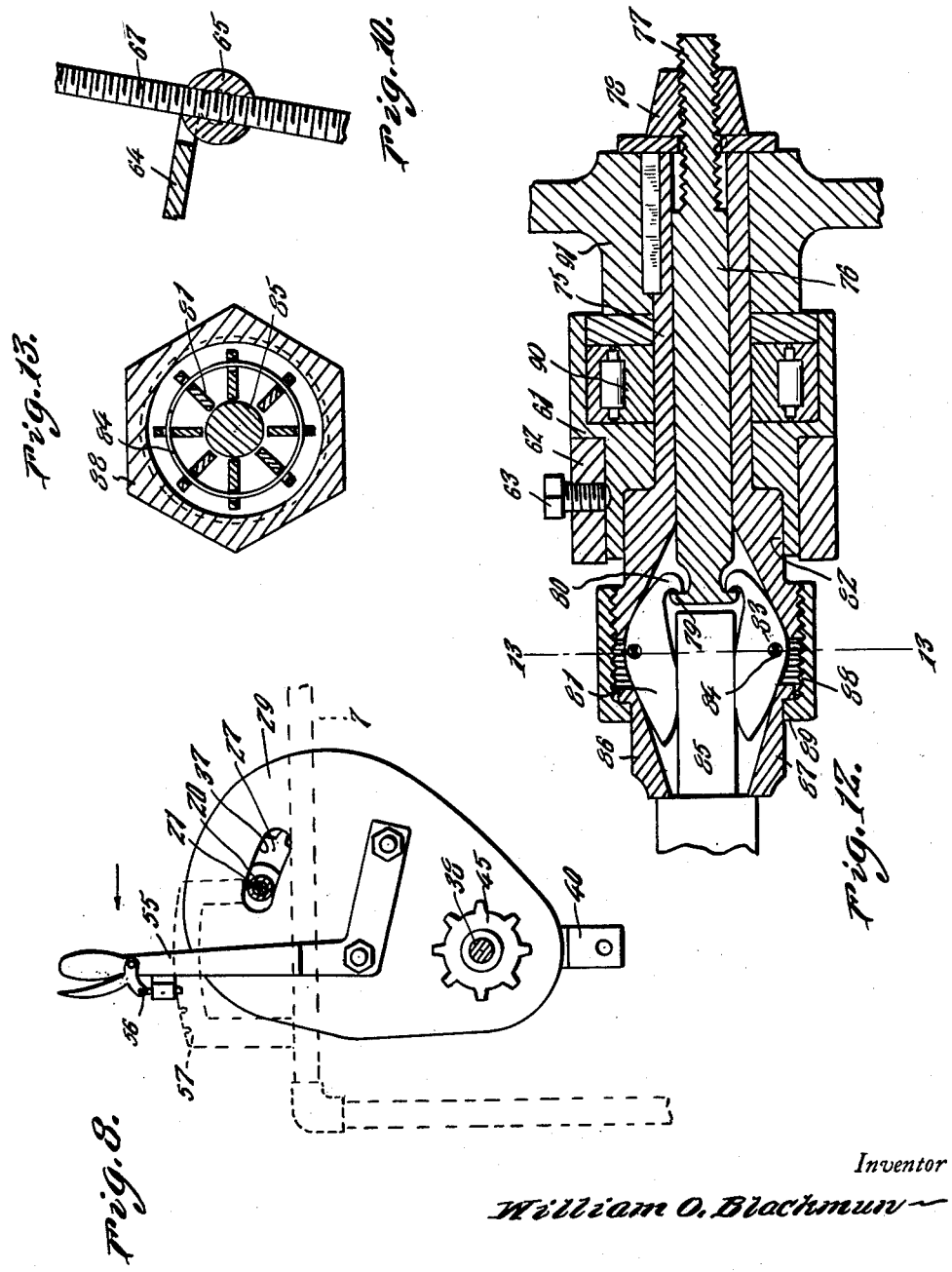
Inventor
William O. Blackmun
By Clarence A. O'Brien
Attorney Patented June 24, 1930

1,766,277

UNITED STATES PATENT OFFICE

WILLIAM O. BLACKMUN, OF HAYS CITY, KANSAS

LAWN-MOWER REEL-TRUING AND SHARPENING MACHINE

Application filed May 26, 1928. Serial No. 280,808.

The present invention relates to lawn mower reel truing and sharpening machines and has for an important object to provide means for rotatably supporting the blade reel in association with the rotating sharpening element and connecting said reel supporting means and said sharpening elements with a common drive for the simultaneous rotation during the sharpening operation.
A further object of the invention is to provide means operable by the reel and sharpening element drive means for reciprocably actuating the sharpening elements longitudinally with respect to the blades of the reel.

An additional object of the invention is to provide a control means for selectively connecting the sharpening elements for longitudinal movement with respect to the reel in either direction and during any period of the rotary or reciprocating actuation thereof.

A still further object of the invention is to provide a pair of chucks for rotatably supporting each end of the blade rail and arranged for individual vertical adjustment, whereby to adjust the inner end of the reel with respect to the inner end of the sharpening element.
An additional object is to provide a power driven apparatus of the above character, for continuously rotating the blade reel and sharpening elements in opposite directions, as well as causing the reciprocable actuation of the sharpening elements simultaneously with the rotation thereof.

Another object is to provide an apparatus of this character of a simple and practical construction, which is compactly arranged, efficient and reliable in performance, in which the various adjustments may be made without necessitating an interruption to the operation thereof, relatively inexpensive to manufacture and install in operative position, and otherwise well adapted for the purposes for which the same is intended.

Other objects and advantages reside in the special construction and combination of the various elements comprising the invention, reference being had to the accompanying drawings, forming a part hereof, wherein:

Figure 1 is a top plan view.
Figure 2 is a side elevational view.
Figure 3 is an end elevational view.
Figure 4 is a vertical transverse sectional view, taken substantially along the line 4—4 of Figure 2.
Figure 5 is a longitudinal sectional view through the sharpening elements operating the said shaft.
Figure 6 is a fragmentary sectional view through the operating gear for the sharpening elements screw and illustrating the manner in which the gear housing is pivotally supported on the shaft for said gear.
Figure 7 is a vertical sectional view through the sharpening elements, taken along the line 7—7 of Figure 5.
Figure 8 is a fragmentary vertical sectional view, taken substantially along the line 8—8 of Figure 2, and illustrating the manual control means for said screw.
Figure 9 is a fragmentary sectional view of the pivotal connection for the reel chuck adjusting mechanism, taken substantially along the line 9—9 of Figure 2.
Figure 10 is a similar view through an opposite end of the adjusting mechanism, taken along the line 10—10 of Figure 2.
Figure 11 is a fragmentary sectional view of the adjustable support for the blades provided for the free ends of the screw for the sharpening element.
Figure 12 is a longitudinal sectional view of one of the blade reel supporting chucks.
Figure 13 is a transverse sectional view taken along the line 13—13 of Figure 12, and
Figure 14 is a fragmentary sectional view, through one of the adjustable connections for the longitudinal adjustment of one of the reel supporting chucks whereby to accommodate reels of different lengths for rotatably supporting the same in sharpening position.

Referring now to the drawings in detail, the invention comprises a supporting frame, composed of uprights 5 and longitudinal and transverse frame members 6 and 7 respectively, supported at the upper ends thereof, the lower portion of the uprights 5 being formed into supporting teeth 8. At one end of the frame is a saddle frame member 9, extending transversely between the opposite sides thereof and forming a support for a power plant 10. The power plant may comprise an internal combustion engine, as shown in the present embodiment of the invention or may consist of any other suitable drive mechanism for operating the apparatus hereinafter described in detail. Arranged at the upper portion of the frame at one side thereof is secured a fuel supply tank 11, suitably connected for supplying fuel to the power plant 10. The crank shaft 12 of the power plant extends rearwardly therefrom and carries a sprocket wheel 13 to operate the chain 14 connected with the sprocket wheel 15 whereby to drive the drive shaft 16, in a manner for rotation at the lower portion. Arranged on the drive shaft 16, at the end thereof adjacent the power plant is mounted a sprocket wheel 17 having a chain drive 18, operatively connected therewith for the operation of the sprocket wheel 19 mounted at one end of the shaft 20 journaled for rotation at the upper portion of the chain and extending longitudinally thereof. The shift 20 is of a tubular formation as clearly illustrated in Figure 5 of the drawings, and disposed within the same is the elongated screw 21 arranged for longitudinal sliding movement within the shaft. The shaft 20 is provided with a longitudinally extending slotted opening 22, extending throughout the shaft for the greater portion of its length and through which slotted opening is extended a pin 23, having a screw threaded engagement with the screw and with its outer end attached to a hub 24, carried by the shaft and providing a mounting for a sharpening wheel 25. The sharpening wheel 25 is removably mounted on the hub and retained in position thereon by means of a nut 26, threaded over one end of the hub whereby to permit the replacement of the wheel when desired.

It will be apparent from this construction, and as clearly illustrated in Figure 5 of the drawing, that the sharpening wheel 25 is arranged for rotation, together with the shaft 20, and at the same time may move longitudinally with respect thereto by reason of the engagement of the hub 24 with the groove carried within the shaft.

On the end of the shaft 20 opposite from the sprocket wheel 19 is freely mounted a gear 27 having a hub 28, arranged at one side thereof, said hub being provided with a threaded bore for threaded engagement with the screw 21. The gear 27 and hub 28 arranged in a gear housing 29, having openings extending through the opposite sides through which the screw 21 is inserted, the end of the shaft 20 terminating within the housing, and its screw continuing outwardly therefrom through the opposite side of the housing. The outer end of this screw 21 is arranged within the sleeve 30 permitting the free longitudinal sliding movement thereof, one end of said sleeve being supported by a boss 31 formed on the housing 29 and the outer end of the sleeve being supported by a plurality of braces 32, diverging in a direction toward the frame, a pair of said braces having their inner ends attached at their upper portion of the frame and another of said braces extending downwardly from the outer end of this sleeve toward the lower portion of the frame for attachment thereto, whereby to support the outer end of the sleeve against downward or transverse movement.

As more clearly illustrated in Figure 11 of the drawing, the braces 32 may be detached from the frame by releasing the wing nuts 33, carried on a bolt 34, which secures a clamping member 35, carried by the brace to one of the frame members. A lug 36, extending laterally from the frame 5 and inserted through an opening in the brace 32, prevents the slipping of the brace longitudinally of the frame member. By reason of this construction, the braces 32 and the sleeve 30 may be disassembled from the frame, for shipping or storing purposes. The opening at each side of the housing 29, through which the shaft 20 and screw 21 are inserted is of an elongated slotted formation, as shown at 37, in Figure 8 of the drawing, so as to permit a limited transverse movement of the upper end of said housing with respect to the screw 21 and its associated parts. The lower end of the housing 29 is provided with openings in its opposite side, through which a pivot pin 38 is inserted, one end of said pin being supported by a bracket 39 attached to the frame 5, and the opposte end of said pin being supported by annular bracket 40, suitably secured to the bracket 39 by bolt and wing nuts 41 and 42 respectively, as will be more readily understood from an inspection of Figure 6 of the drawings.

The pin 38 rotatably supports the hub 43 having one end disposed within the housing 39 and to which end is attached the spur gear 44. A portion of the hub 43 is also disposed outwardly of the housing 29, said outer portion having a sprocket wheel 45 attached thereto arranged for operation through a chain 46 with a sprocket wheel 47 carried at the end of the drive shaft 16. A chain tightener is provided for the chain 46 comprising a sprocket wheel 48 rotatably supported at the outer end of the bracket 49, adjustably attached on the bolt 41 by the wing nuts 42. The gears 27 and 44 arranged within the housing 29 are spaced apart, as clearly illustrated in Figure 3 of the drawings, and interposed between said gears is arranged a pair of idler gears 50 and 51 respectively. The gears 50 and 51 are inter-connected for simultaneous operation, in opposite directions and are rotatably supported upon stub shafts 52 and 53 respectively carried by the housing. A plate 54 extends between said shafts so as to prevent spreading action thereof and thus secure the gears in constant engagement. The shafts 52 and 53 extend outwardly from one side of the housing and to the outer ends thereof is atached an operating lever 55, said levers being provided with a latch mechanism 56 associated with a quadrant 57, for securing the lever in a predetermined position.

The arangement of the lever in one extreme position as shown in Figure 3 of the drawing, operates to retain the housing 29 with the gear 50 forming an operative connection between the gears 27 and 44. The gear 50 is constantly engaged with the gear 44, and the movement of the lever 55 into its intermediate position will operate to move the gear 50 out of engagement with the gear 27, so that the screw 21 will be inactive. The movement of the lever 55 into its opposite extreme position will cause the engagement of the gear 51 with the gear 27 and thus cause the operation of the gear 27 in an opposite direction for reversing the movement of the screw 21 and thus provide means for the reciprocating movement of the sharpening wheel. From the foregoing description it will be apparent that the screw 21 may be rotatably connected with the drive shaft 16, and is adapted for reciprocating movement by reason of its operative connection with the train of gearing mounted in the housing 29, and by moving the lever 55 in a predetermined manner, the sharpening wheel 25 may be caused to move longitudinally in opposite directions simultaneously with or independently of the rotation thereof through the shaft 20. The lawn mower blade reel 58 is arranged for supporting with the blades 59 thereof in position for engagement by the sharpening wheel 25, each end of the reel being supported within a rotating chuck indicated generally at 16, to produce the rotary movement of the reel in a manner more fully hereinafter explained.

The specific construction of the chucks 16 is clearly illustrated in Figure 12 of the drawing, and comprises a tubular body portion 61, to the outer periphery of which is attached a clamp 62, by means of a set screw 63, said clamp being carried at the outer end of the supporting arm 64. The opposite end of the arm 64 is pivotally supported upon one of the upper longitudinal frame members 66. The free end of the arm 64 is bifurcated as shown at 65, and pivotally supports a pin 66, between the bifurcated ends thereof, said pins having a threaded opening extending transversely therethrough for threadedly receiving the upper end of the screw 67. The lower end of the screw 67 is also inserted transversely through a pin 68, pivotally supported upon a bracket 69, upon a transversely extending frame member 70. The screw 67 is also provided with an operating reel 71, through the movement of which the screw may be rotated, whereby to cause the vertical adjustment of the free end of the arm 64. Each of the chucks 60 is supported for vertical adjustment at the free end of the arm 64, in the manner just explained and one of the transversely extending frame members 70 through which the lower end of the vertical adjusting mechanism is attached is also arranged for longitudinal adjusting movement with respect to the frame by providing a clamping connection at each end of the transverse member 70 to the lower longitudinal frame member.

This adjustable connection for the longitudinal adjustment of one of the chucks is clearly illustrated in Figure 14 of the drawing and comprises a clamping plate 72, attached to the frame member 70 by means of a bolt and wing nut 73 and 74 respectively, for clamping engagement with the frame member 6. In this manner, one of the chucks may be adjusted relatively with respect to the other chuck so as to support reels of variation in length in operative position therebetween. Extending through the body of the chuck 61 is a sleeve 75, through which extends the rod 76, one end of said rod being threaded as shown at 77, for threadedly receiving a wing nut 78 and the opposite end of said rod having a flange 79 formed thereon for engaging the hooked ends 80 of a plurality of circumferentially disposed fingers 81. The end of the sleeve 75 adjacent the flanged end 79 of the rod is formed into a socket head 82, within which the hooked end of the fingers are disposed, the opposite ends of each of the fingers extending outwardly from said sockets in longitudinally spaced apart relation. Each of the fingers 81 is formed intermediate its ends with an opening 83, the ends of a coil spring 84 being inserted through said opening whereby to retain the fingers in circumferentially disposed position and between the outer ends of the fingers 81 is inserted the shaft end 85 of the blade reel 58.

About the shaft end and fingers is arranged a sectional collar, the respective sections thereof being indicated at 87 and 88 respectively and disposed in telescopic relation with respect to each other, the adjacent ends thereof being formed with interengaging flanges 89 for the longitudinal movement of the collar as a unit, in one direction. The outer periphery of the socket member 82 is threaded to provide a threaded engagement with the collar section 88 and through such threaded engagement to move the collar section 87 against the outer edges of the fingers 81, whereby to force the same inwardly in gripping relation with the shaft end 85 of the reel. A set of roller bearings 90 is interposed between the sleeve 75 and the body 61 of the stud, to facilitate the rotary movement therebetween. Keyed to the sleeve 75 of one of the chuck assemblies, is a sprocket wheel 91 arranged for operation by the chain 18, simultaneously with the operation of the shaft 20. The chain 18 is also provided with an adjustable belt tightener comprising a sprocket wheel 92 rotatably supported at the upper end of the chain tightening frame 93, the lower end thereof being pivotally supported to one of the lower frame members 6. Intermediate the ends of the frame 93 is attached a bracket 94 having a threaded opening extending therethrough for receiving the screw 95, one end of said crew being rotatably supported in a bracket 96 carried by the frame 6 and retained thereby against longitudinal movement and provided with an operating handle 97. To the end of the drive shaft 16 adjacent the power plant is arranged a crank pin 98, through means of which a hand crank may be attached to the shaft for starting the motor.

It will be apparent from the foregoing that upon the arrangement of the lawn mower reel 58 with its opposite ends supported for rotation with the chucks 60, as clearly illustrated in Figure 2 of the drawings, and suitably adjusting the chuck vertically so as to cause the engagement of the blades 59 of the reel with the sharpening reel 25, and upon operating the power plant, the reel and sharpening wheel will be rotated, whereby to effect a sharpening of the blades. Also, through the manipulation of the screw control lever 55, the screw may be engaged for causing the longitudinal movement of the sharpening reel with respect to the wheel 58, simultaneously with the rotation thereof, and in this manner to enable the sharpening of the blade throughout the entire length thereof.

It is obvious that the invention is susceptible of various changes and modifications without departing from the spirit or scope of the invention or sacrificing any of its advantages, and I accordingly claim all such forms of the invention which I am entitled to.

Having thus described my invention, what I claim as new is:

1. A lawn mower reel sharpening and truing machine comprising a pair of reel supporting chucks adapted for supporting the opposite ends of the reel in a horizontal position upon the machine, means for independently adjusting either of said chucks vertically, longitudinal adjusting means for one of said chucks, a shaft rotatably supported in spaced parallel relation with respect to the axis of the reel, a sharpening wheel rotatably carried on said shaft, a screw arranged within the shaft and arranged for longitudinal movement with respect thereto, means connecting the screw with the sharpening wheel, common drive means for one of said chucks, said shaft and said screw, and manual control means for the screw and arranged for reversing the direction of movement thereof, independent of the rotation of said shaft.

2. A lawn mower reel sharpening and truing machine comprising a pair of reel supporting chucks adapted for supporting the opposite ends of the reel in a horizontal position upon the machine, means for independently adjusting either of said chucks vertically, longitudinal adjusting means for one of said chucks, a shaft rotatably supported in spaced parallel relation with respect to the axis of the reel and having a longitudinal slotted opening therein, a sharpening wheel slidably mounted on the shaft, a screw slidably mounted in the shaft and fixedly secured to said wheel for rotation as a unit with the shaft, common drive means for one of said chucks and said shaft, a pivotally mounted gear housing having an arcuate slotted opening for receiving the shaft and the screw, a gear within the housing threaded on said screw, a driven gear journaled in the housing and a pair of interconnected transmission gears journaled in the housing and movable therewith about the pivot of the housing, one of said gears being constantly engaged with the driven gear and both of said gears being selectively engageable with the first named gear whereby to reversally operate the same and to produce a reciprocating movement of the screw and the sharpening wheel during rotation of the same.

In testimony whereof I affix my signature.

WILLIAM O. BLACKMUN.